No. 762,011. PATENTED JUNE 7, 1904.
A. WEIGAND.
MEANS FOR UNLOADING FREIGHT CARS.
APPLICATION FILED FEB. 20, 1903. RENEWED FEB. 11, 1904.
NO MODEL. 2 SHEETS—SHEET 1.
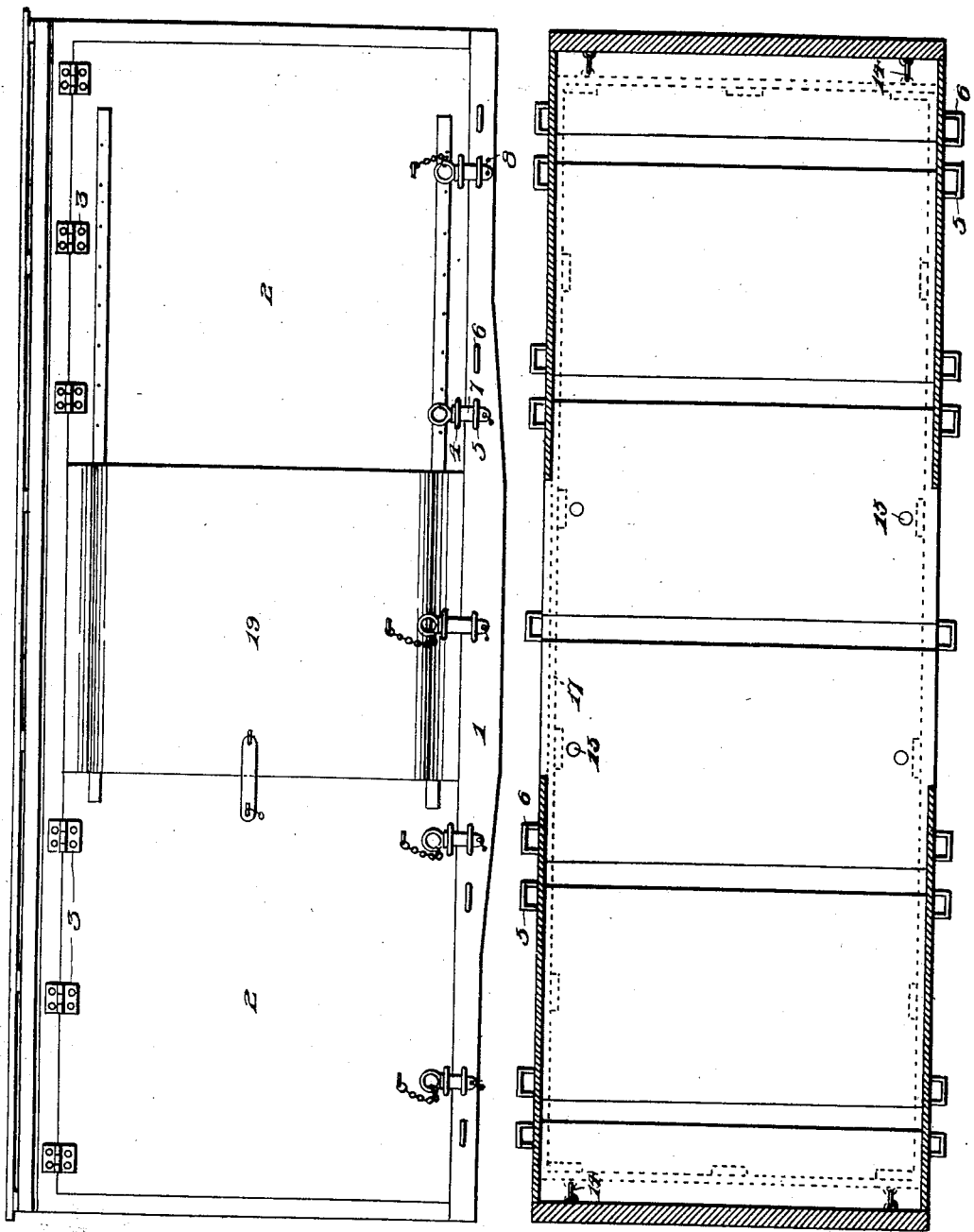

No. 762,011. PATENTED JUNE 7, 1904.
A. WEIGAND.
MEANS FOR UNLOADING FREIGHT CARS.
APPLICATION FILED FEB. 20, 1903. RENEWED FEB. 11, 1904.
NO MODEL. 2 SHEETS—SHEET 2.
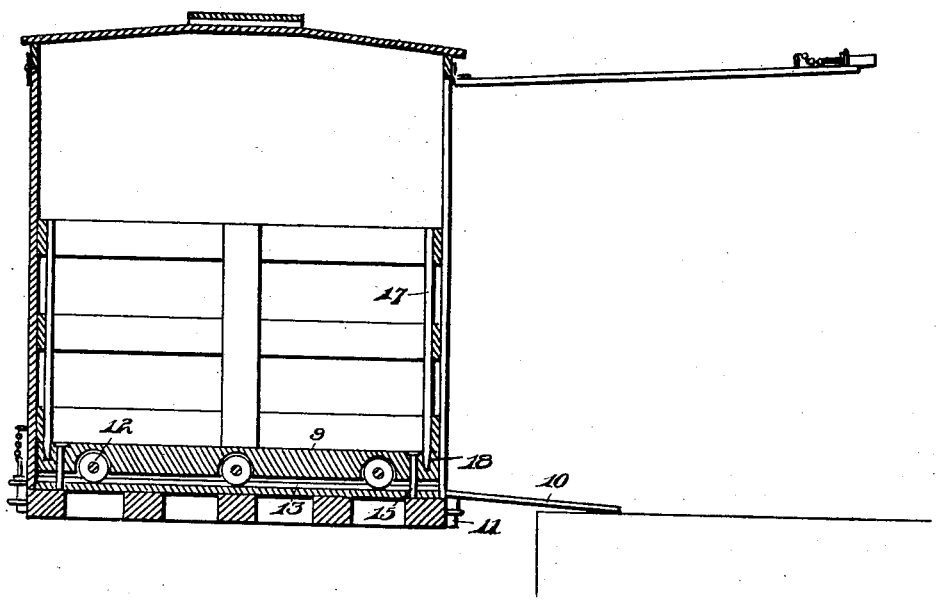
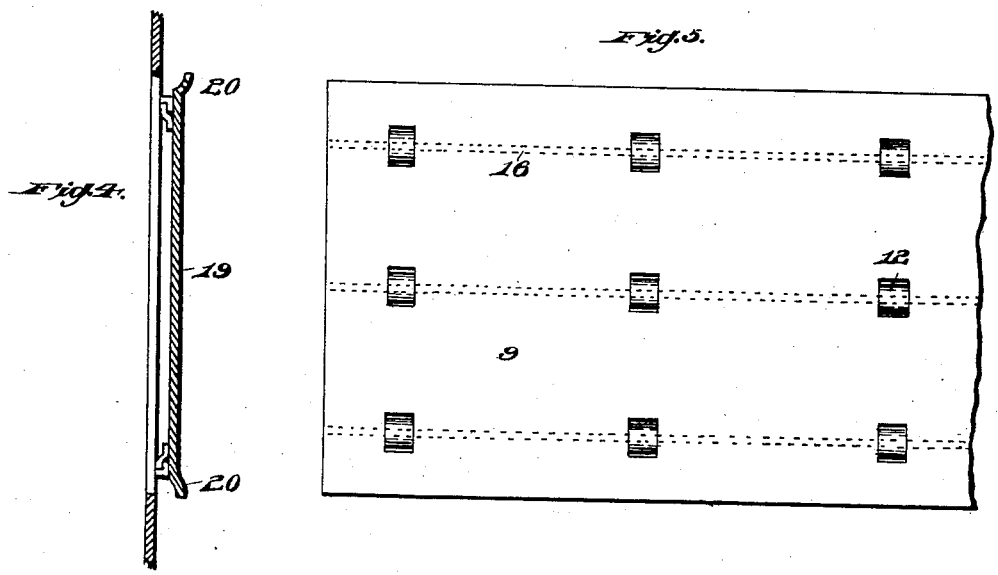

No. 762,011.

Patented June 7, 1904.

UNITED STATES PATENT OFFICE.

AUGUST WEIGAND, OF PITTSBURG, PENNSYLVANIA.

MEANS FOR UNLOADING FREIGHT-CARS.

SPECIFICATION forming part of Letters Patent No. 762,011, dated June 7, 1904.

Application filed February 20, 1903. Renewed February 11, 1904. Serial No. 193,196. (No model.)

*To all whom it may concern:*

Be it known that I, AUGUST WEIGAND, a citizen of the United States of America, residing at Pittsburg, in the county of Allegheny and State of Pennsylvania, have invented certain new and useful Improvements in Means for Unloading Freight-Cars, of which the following is a specification.

My invention relates to an improvement in loading and unloading freight-cars.

It is a well-known fact that the loading and unloading of freight by the present method of hand-trucks is a long and tedious operation, whereas by my improved truck the entire contents of a car are removed or placed in the car in bulk.

Now with a car constructed, as set forth in my application, with hinged sides the same may be raised, as shown in Figure 3, and the truck removed from either side in a comparatively short time. The bottom of car has grooved passages for the admission of truck-wheels and also to retain truck in position after once being placed in car. To doubly secure truck in car, I provide hooks at each end and also pins that enter floor of car. By this means it is absolutely impossible for the truck to have a forward thrust.

The car when closed for shipment will appear as shown in Fig. 1 and each pin being provided with the ordinary lead seal.

My improved car, besides being constructed on the lines set forth and the use thereof, has all the advantages of the cars in present use, as the swinging sides will not interfere with the old style of sliding door.

My invention consists in constructing a car and truck of the character described that will be strong, durable, and efficient in its operation and one that will be comparatively easy to manufacture.

Furthermore, the invention consists in the novel details of construction and operation, a preferable embodiment of which is described in the specification and illustrated in the drawings, wherein—

Fig. 1 is a side view of car constructed in accordance with my invention. Fig. 2 is a longitudinal section view taken on the line 2 2 of Fig. 1 and showing the truck in dotted lines. Fig. 3 is a transverse sectional view showing one side of car raised. Fig. 4 is a vertical section view of sliding door. Fig. 5 is a bottom plan view of truck.

In the drawings, 1 designates the car, which may be constructed of any suitable material. In constructing the car I provide swinging sides 2, that are hinged, as at 3, to the sill of car. Secured to the swinging sides and also to bottom of car are U-shaped straps 4, 5, and 6 and when pin 7 are placed therein for the purpose of shipment will appear as shown in Fig. 1 and before opening same will be compelled to destroy the ordinary sealing-stamps 8. The straps 5 and 6 on bottom of car are used as a locking means, and also when truck 9 is to be placed upon car or removed therefrom I provide a gang-plank 10, with lugs 11 thereon, that fit into straps 5 and 6.

The truck 9 is equipped with a number of rollers 12, that correspond to the grooves 13, provided in the bottom of car. The grooves will retain the truck in place; but to make it more secure provide hooks 14 at each end of car and also pins 15, that fit into floor of car. These will prevent the truck from moving to the side. The rollers 12 are mounted on shaft 16—that is, the entire length of truck. This form of construction is very strong, as the shaft has a bearing-surface the entire length, excepting where there is a cut-out for the rollers.

The uprights 17, that support the sides of crate, fit into apertures 18, provided in bottom of truck, as it is often necessary to remove sides thereof in loading and unloading certain merchandise.

The sliding door 19 is flared out at the top and bottom, as at 20, so it will not come in contact with the hinges and also the securing-pins.

From the above it will be seen that I have invented a novel means which will accomplish an advantageous function and one that has not been heretofore conceived by any one.

I do not care to limit myself to the exact details of construction and operation herein set forth, as I may make various changes in the same within the scope of my claim and without departing from the spirit of my invention.

Having thus fully described my invention, what I claim as new, and desire to secure by Letters Patent, is—

In a freight-car, a car-body having open sides, hinged doors for closing the side, the said hinged portion comprising two sections with intervening space, door-hangers carried by the sides, a door slidable thereon, staples secured to the sides and to the car-frame, a grooved floor for the car and trucks having wheels registering with the grooves, and pins run through the truck-bottom and floor.

In testimony whereof I affix my signature, in the presence of two witnesses, this 19th day of February, 1903.

AUGUST WEIGAND.

Witnesses:
 JOHN NOLAND,
 J. P. APPLEMAN.